US007857703B2

(12) United States Patent
Lin et al.

(10) Patent No.: US 7,857,703 B2
(45) Date of Patent: Dec. 28, 2010

(54) ORIENTATION DEVICE AND METHOD FOR COORDINATE GENERATION EMPLOYED THEREBY

(75) Inventors: Chih-Hsin Lin, Hsinchu-Hsien (TW); Hsin-Chia Chen, Hsinchu Hsien (TW); Chang-Che Tsai, Hsinchu Hsien (TW); Yi-Fang Lee, Hsinchu Hsien (TW); Hsuan-Hsien Lee, Hsinchu Hsien (TW); Tzu-Yi Chao, Hsinchu Hsien (TW)

(73) Assignee: FixArt Imaging Incorporated, Hsin-Chu (TW)

( * ) Notice: Subject to any disclaimer, the term of this patent is extended or adjusted under 35 U.S.C. 154(b) by 1100 days.

(21) Appl. No.: 11/392,089

(22) Filed: Mar. 28, 2006

(65) Prior Publication Data

US 2006/0258465 A1    Nov. 16, 2006

(30) Foreign Application Priority Data

May 10, 2005    (TW)    ............................... 94115044 A

(51) Int. Cl.
*A63F 9/24* (2006.01)
*A63F 13/00* (2006.01)
*G06F 17/00* (2006.01)
*G06F 19/00* (2006.01)
*G06F 3/033* (2006.01)
*G09G 5/08* (2006.01)

(52) U.S. Cl. ............................... 463/51; 463/37; 463/47; 345/158

(58) Field of Classification Search ............. 463/51–57; 345/419, 420, 427
See application file for complete search history.

(56) References Cited

U.S. PATENT DOCUMENTS 6,146,278 A * 11/2000 Kobayashi .................... 463/53

(Continued)

FOREIGN PATENT DOCUMENTS

JP    2002-298145    10/2002

(Continued)

OTHER PUBLICATIONS

Created on May 4, 2002, http://www.arch.cam.ac.uk/comp/ac019/index.pdf, Accessed on Apr. 30, 2003.*

*Primary Examiner*—Pierre Eddy Elisca
*Assistant Examiner*—Reginald A Renwick
(74) *Attorney, Agent, or Firm*—Tung & Associates

(57) ABSTRACT

A method for coordinate generation to be implemented using an orientation device includes the steps of: providing at least three reference marks on a target; aiming the orientation device at an initial point on the target, and operating the orientation device such that the sensor is able to capture an image of the target that contains at least one of the reference marks; correlating a coordinate space of the orientation device with a coordinate space of the target; aiming the orientation device at a target point on the target, and operating the orientation device such that the sensor is able to capture an image of the target that contains the reference marks; and determining relative coordinates of the target point with reference to the established coordinate space relation and the captured image. An orientation device that performs the method is also disclosed.

3 Claims, 7 Drawing Sheets

U.S. PATENT DOCUMENTS

| | | | |
|---|---|---|---|
| 6,704,000 B2 * | 3/2004 | Carpenter | 345/158 |
| 6,833,565 B2 * | 12/2004 | Su et al. | 257/98 |
| 7,106,311 B2 * | 9/2006 | Tsang | 345/178 |
| 2001/0010514 A1 * | 8/2001 | Ishino | 345/158 |
| 2005/0026703 A1 * | 2/2005 | Fukawa | 463/51 |
| 2005/0272506 A1 * | 12/2005 | Sumi | 463/51 |
| 2006/0105842 A1 * | 5/2006 | Kim et al. | 463/51 |
| 2006/0152487 A1 * | 7/2006 | Grunnet-Jepsen et al. | 345/158 |
| 2006/0152489 A1 * | 7/2006 | Sweetser et al. | 345/158 |

FOREIGN PATENT DOCUMENTS

| | | |
|---|---|---|
| JP | 2005-21458 A | 1/2005 |

* cited by examiner

ORIENTATION DEVICE AND METHOD FOR COORDINATE GENERATION EMPLOYED THEREBY

CROSS-REFERENCE TO RELATED APPLICATION

This application claims priority of Taiwanese application no. 094115044, filed on May 10, 2005.

BACKGROUND OF THE INVENTION

1. Field of the Invention

This invention relates to a method for coordinate generation and to an orientation device that generates coordinates of target points using the method.

2. Description of the Related Art

FIG. 1 illustrates a conventional light gun 8 for a video game system 9, which includes an image sensor 82 and a timer 81. The video game system 9 further includes a display 91 and a game controller 92. The display 91 includes a cathode-ray tube screen 910 that presents images through interlace scanning. The game controller 92 is installed with gaming software. The light gun 8 is connected electrically and transmits coordinate signals to the game controller 92, which then responds by controlling progress of the game, including presentation of images on the screen 910 of the display 91.

The conventional method for coordinate generation using the aforementioned conventional light gun 8 includes the following steps:

a) aiming the light gun 8 at a target point 911 on the screen 910 of the display 91, and operating the light gun 8 such that the image sensor 82 is able to capture an aimed part of the image presented on the screen 910 of the display 91 and such that the timer 81 is able to determine the scanning time at which the target point 911 is scanned with reference to the presentation of the image on the screen 910 of the display 91; and b) determining the coordinates of the target point 911 with reference to the scanning time determined in step a).

The aforementioned method is disadvantageous since it is applicable only for displays that employ interlace scanning technique.

SUMMARY OF THE INVENTION

Therefore, the object of the present invention is to provide a method for coordinate generation, which is applicable for targets that use and do not use interlace scanning.

Another object of the present invention is to provide an orienting device which generates coordinates of target points and which is suitable for targets that use and do not use interlace scanning.

According to the first aspect of the present invention, a method for coordinate generation is implemented using an orientation device that is provided with at least one sensor, and comprises the steps of:

A) providing at least three reference marks on a target;

B) aiming the orientation device at an initial point on the target, and operating the orientation device such that the sensor is able to capture an image of the target that contains at least one of the reference marks;

C) from the image captured in step B), correlating a coordinate space of the orientation device with a coordinate space of the target;

D) aiming the orientation device at a target point on the target, and operating the orientation device such that the sensor is able to capture an image of the target that contains the reference marks; and E) determining relative coordinates of the target point with reference to the coordinate space relation established in step C), and the image captured in step D).

According to the second aspect of the present invention, a method for coordinate generation is implemented using a light gun that is provided with a sensor, and comprises the steps of:

A) providing at least three reference marks on a display;

B) aiming the light gun at an initial point on the display, and operating the light gun such that the sensor is able to capture an image of the display that contains at least one of the reference marks;

C) from the image captured in step B), correlating a coordinate space of the light gun with a coordinate space of the display;

D) aiming the light gun at a target point on the display, and operating the light gun such that the sensor is able to capture an image of the display that contains the reference marks; and E) determining relative coordinates of the target point with reference to the coordinate space relation established in step C), and the image captured in step D).

According to the third aspect of the present invention, a system comprises a target, at least three reference marks, and an orientation device. The target defines a coordinate space. The reference marks are provided on the target. The orientation device defines a coordinate space that is correlated with the coordinate space of the target, and includes a sensor and a processor. The sensor is able to capture an image of the target that contains the reference marks when the orientation is operated while aiming at a target point on the target. The processor is coupled to the sensor, and is operable so as to determine relative coordinates of the target point with reference to the coordinate space relation between the target and the orientation device, and the image captured by the sensor.

According to the fourth aspect of the present invention, there is provided an orientation device for a system, which includes a target provided with at least three reference marks. The orientation device defines a coordinate space that is correlated with a coordinate space of the target, and comprises a sensor and a processor. The sensor is adapted to capture an image of the target that contains the reference marks when the orientation device is operated while aiming at a target point on the target. The processor is coupled to the sensor, and is operable so as to determine relative coordinates of the target point with reference to the coordinate space relation between the target and the orientation device, and the image captured by the sensor.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
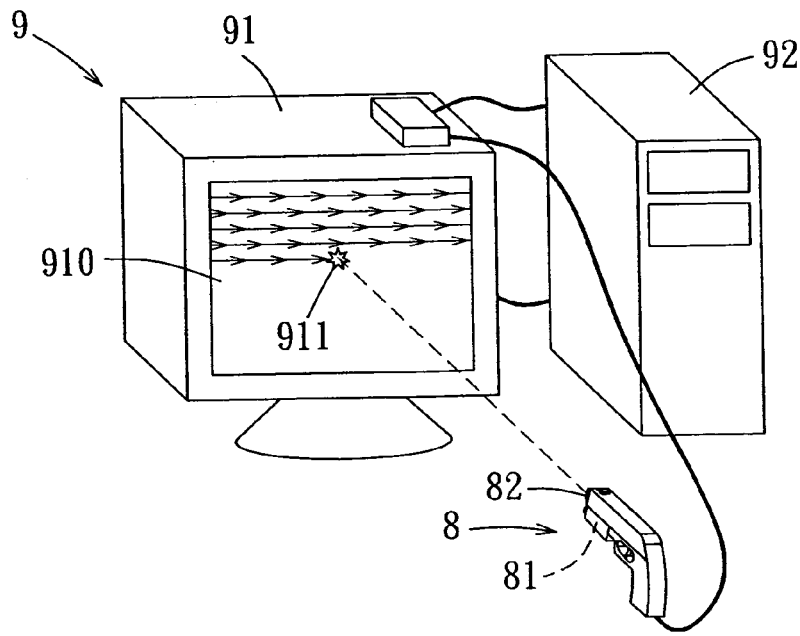
FIG. 1 is a schematic view of a conventional video game system.
Figure 2:
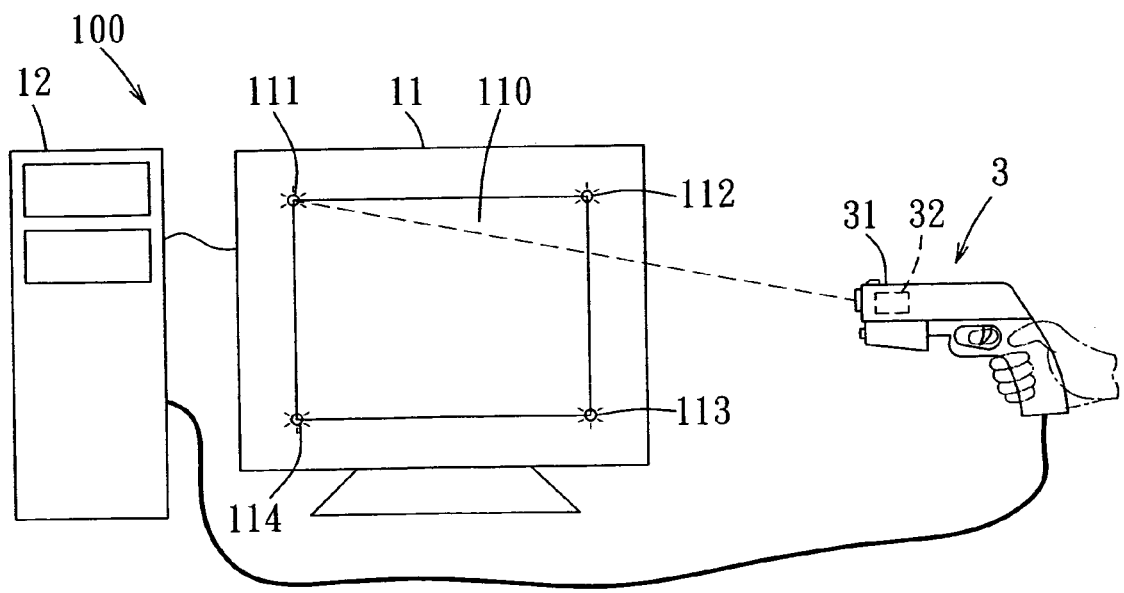
FIG. 2 is a schematic view of a system that incorporates the preferred embodiment of an orientation device according to the present invention.
Figure 3:
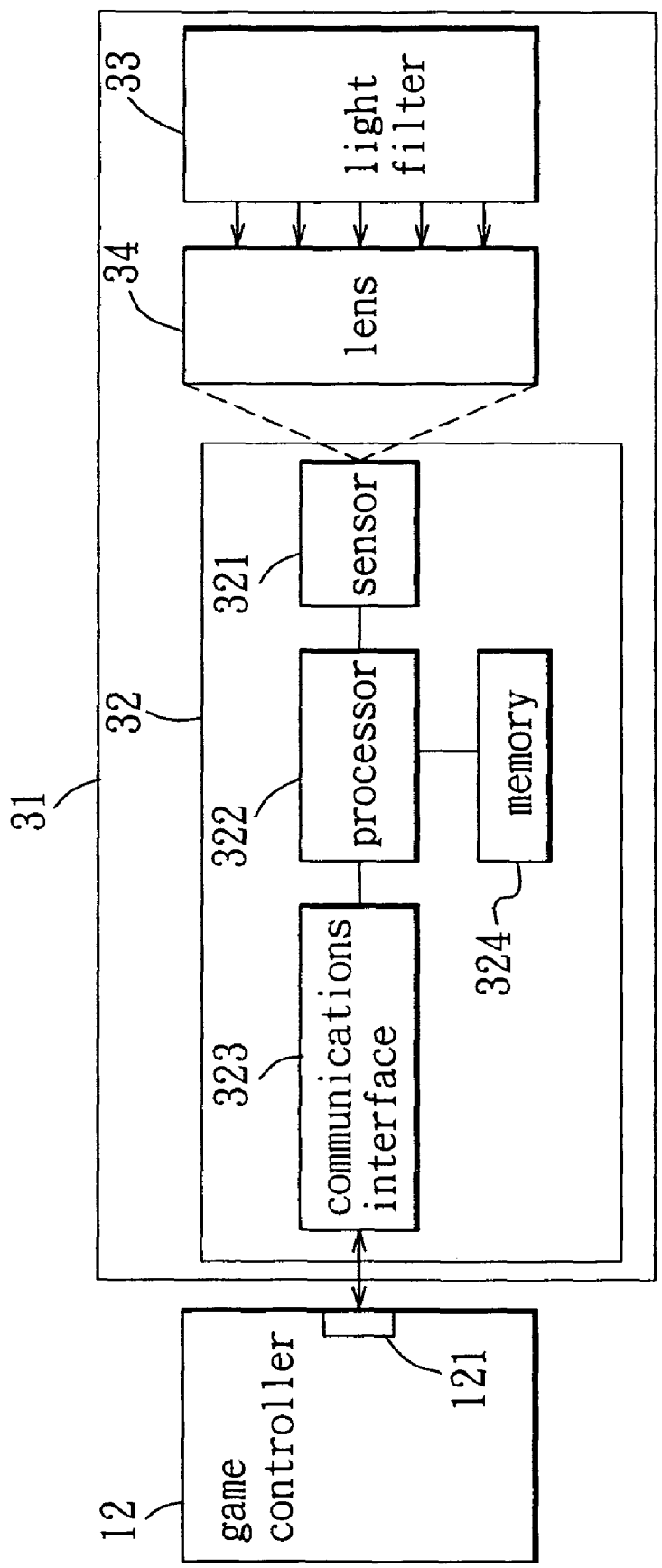
FIG. 3 is a schematic block diagram of the preferred embodiment.

Referring to FIGS. 2 and 3, the preferred embodiment of an orientation device 3 of a system 100 according to this invention is shown to include a controller module 32, a light filter 33, a lens 34, and a casing 31.

The system 100 further includes a target 11, four reference marks 111, 112, 113, 114, and a game controller 12.

The target 11, in this embodiment, is a display that includes a generally rectangular screen 110, which defines a coordinate space. Preferably, the display 11 may be one of a liquid crystal display (LCD), a plasma display panel (PDP) display, a cathode-ray tube (CRT) display, and a projection display. In an alternative embodiment, the target 11 could be a wall or a ceiling of a room.

Each of the reference marks 111, 112, 113, 114 is provided on a respective one of the corners of the screen 110 of the display 11. In this embodiment, each of the reference marks 111, 112, 113, 114 is a light source. Preferably, each of the reference marks 111, 112, 113, 114 is a light-emitting diode. In an alternative embodiment, each of the reference marks 111, 112, 113, 114 may be a reflector or a colored pattern.

Although the system 100 of this invention is exemplified using four of the reference marks 111, 112, 113, 114, it should be noted that the number of reference marks 111, 112, 113, 114 could be reduced to three.

The game controller 12 is installed with gaming software in a manner well known in the art. In this embodiment, the game controller 12 may include a wired or wireless communications interface 121. Preferably, the communications interface 121 of the game controller 12 is a serial communications interface. In an alternative embodiment, the communications interface 121 of the game controller 12 is a parallel communications interface.

The orientation device 3 of this embodiment is a light gun that defines a coordinate space. In this embodiment, the orientation device 3 is operable so as to generate a coordinate of a target point (P) aimed thereby on the screen 110 of the display 11, in a manner that will be described hereinafter.

The controller module 32 of the orientation device 3 includes a sensor 321, a processor 322, a memory 324, and a communications interface 323.

The sensor 321 of the controller module 32 of the orientation device 3 is operable so as to capture an image of the screen 110 of the display 11 that contains the reference marks 111, 112, 113, 114, and so as to convert the captured image into a digitized image. In this embodiment, the sensor 321 of the controller module 32 of the orientation device 3 is an image sensor. Preferably, the sensor 321 of the controller module 32 of the orientation device 3 may be one of a complementary metal-oxide-semiconductor (CMOS) device and a charged-coupled device (CCD).

The processor 322 of the controller module 32 of the orientation device 3 is coupled to the sensor 321 of the controller module 32 of the orientation device 3, and is operable so as to receive and process the digitized image accordingly.

The memory 324 of the controller module 32 of the orientation device 3 is coupled to the processor 322 of the controller module 32 of the orientation device 3, and serves to temporarily store the digitized image processed by the processor 322.

The communications interface 323 of the controller module 32 of the orientation device 3 is coupled to the processor 322 of the controller module 32 of the orientation device 3, and is connected electrically to the communications interface 121 of the game controller 12 for transmitting signals between the orientation device 3 and the game controller 12, in a manner well known in the art. It is noted that the communications interface 323 of the controller module 32 may be a serial or parallel communications interface.

In an alternative embodiment, the communications interface 323 of the controller module 32 of the orientation device 3 is a wireless communications interface.

The light filter 33 of the orientation device 3 is disposed in front of the sensor 321 of the controller module 32 of the orientation device 3, and serves to filter undesired light spectrum.

The lens 34 of the orientation device 3 is disposed between the light filter 33 and the sensor 321.

The casing 31 of the orientation device 3 is in the shape of a gun, and houses the light filter 33, the lens 34, and the controller module 32.

Figure 4A:
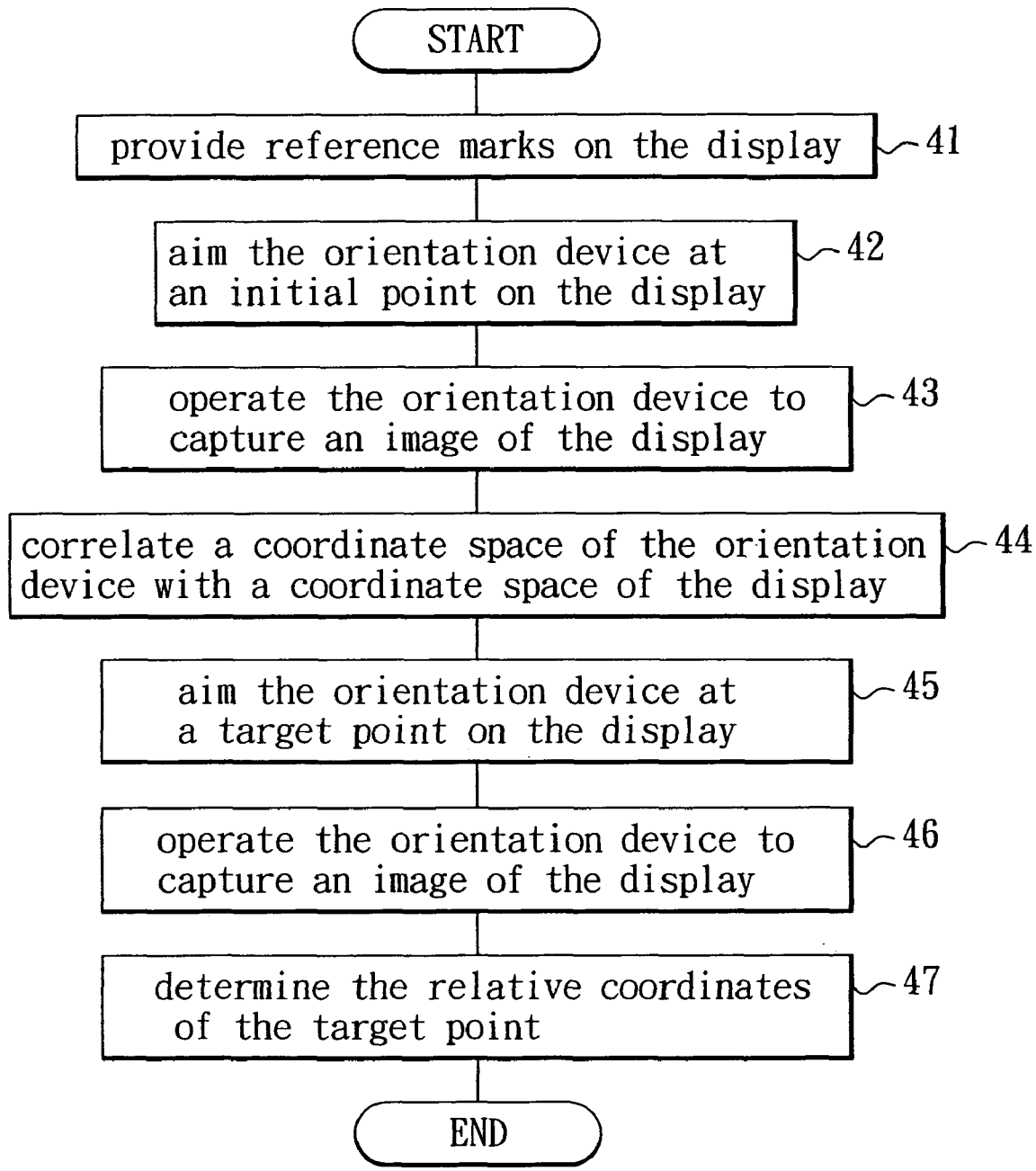
FIGS. 4A and 4B are flowcharts to illustrate the first preferred embodiment of a method for coordinate generation using an orientation device according to the present invention.
Figure 4B:
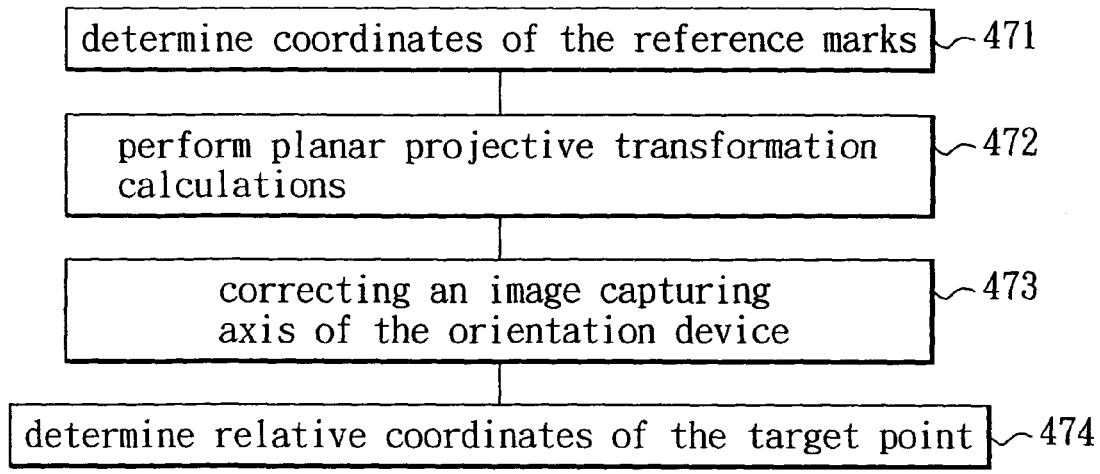

The first preferred embodiment of a method for coordinate generation to be implemented using the orientation device 3 of the system 100 according to this invention is described with further reference to FIGS. 4A and 4B.

In step 41, each of the reference marks 111, 112, 113, 114 is provided on a respective one of the corners of the screen 110 of the display 11.

Figure 5:
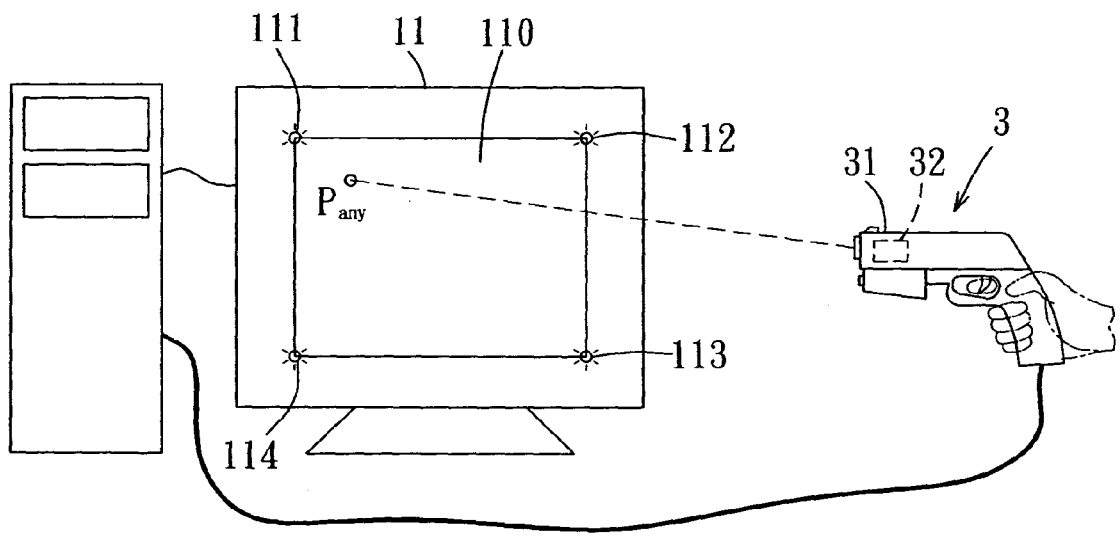
FIG. 5 illustrates a target point aimed by the orientation device.

It is noted that, with further reference to FIG. 5, the coordinates of each of the reference marks 111, 112, 113, 114 are identical to those of the corners of the screen 110 of the display 11.

In step 42, the orientation device 3 is aimed at an initial point on the screen 110 of the display 11.

It is noted that, in this step, one of the reference marks 111, 112, 113, 114, such as the reference mark 111, serves as the initial point on the screen 110 of the display 11.

In step 43, the orientation device 3 is operated such that the sensor 321 of the controller module 32 of the orientation device 3 is able to capture an image of the screen 110 of the display 11 that contains the reference mark 111 aimed in step 42.

In step 44, from the image captured in step 43, the processor 322 of the controller module 32 of the orientation device 3 correlates the coordinate space of the orientation device 3 with the coordinate space of the screen 110 of the display 11.

Figure 6:
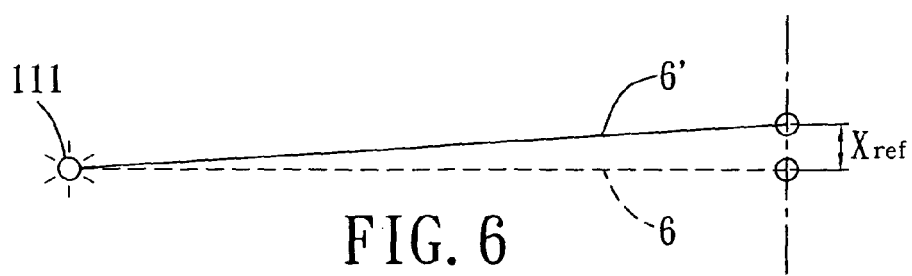
FIG. 6 illustrates an axis correction value determined by the orientation device.

It is noted that, in this step, the processor 322 of the controller module 32 of the orientation device 3 determines an axis correction value ($X_{ref}$) associated with mapping of the initial point 111 onto the coordinate space of the orientation device 3, as illustrated in FIG. 6. In this embodiment, the axis correction value ($X_{ref}$) refers to an elevation angle formed by the orientation device 3 with an axis 6 of the initial point 111 on the screen 110.

In step 45, as illustrated in FIG. 5, the orientation device 3 is aimed at a target point ($P_{any}$) on the screen 110 of the display 11.

In step 46, the orientation device 3 is operated such that the sensor 321 of the controller module 32 of the orientation device 3 is able to capture an image of the screen 110 of the display 11 that contains the reference marks 111, 112, 113, 114.

In step 47, the processor 322 of the controller module 32 of the orientation device 3 determines the relative coordinates of the target point ($P_{any}$) with reference to the coordinate space relation established in step 44, and the image captured in step 46. Thereafter, the flow goes back to step 45.

In this embodiment, step 47 includes the sub-steps of:

sub-step 471: determining coordinates of the reference marks 111, 112, 113, 114 in the image captured in step 46;

sub-step 472: performing planar projective transformation calculations upon the coordinates of the reference marks 111, 112, 113, 114 determined in sub-step 471 to obtain a transformation matrix ($H_{any}$);

sub-step 473: correcting an image capturing axis 6' (see FIG. 6) of the sensor 321 of the controller module 32 of the orientation device 3 based on the transformation matrix ($H_{any}$) obtained in sub-step 472 and the axis correction value ($X_{ref}$) obtained in step 44; and sub-step 474: determining the relative coordinates of the target point ($P_{any}$) with reference to the corrected image capturing axis 6'.

It is noted that steps 41 to 44 are performed only to calibrate the orientation device 3. Once calibrated, steps 41 to 44 are skipped. Steps 42 to 44 may be skipped if the system is installed under predefined parameters.

Figure 7A:
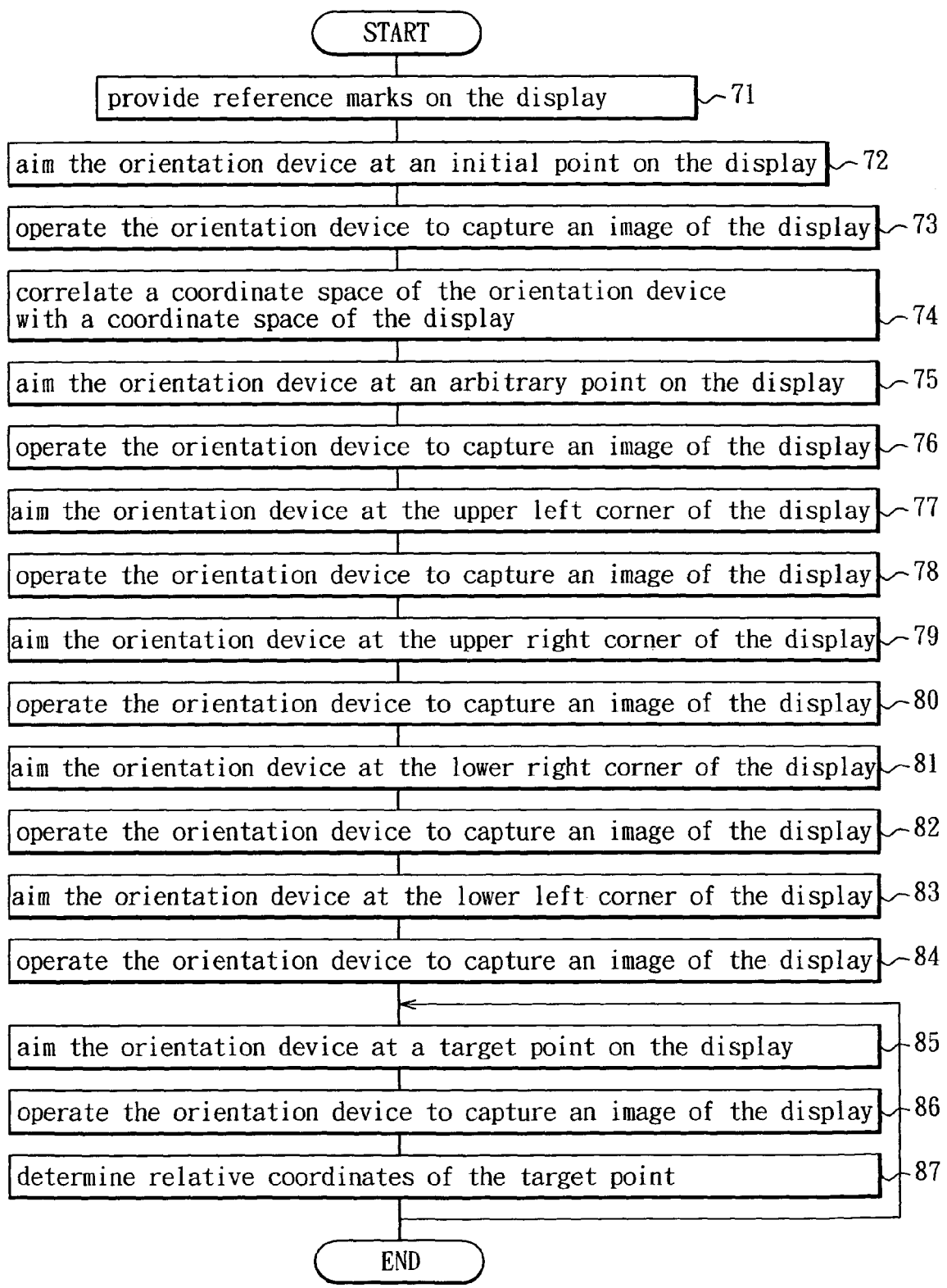
FIGS. 7A and 7B are flowcharts to illustrate the second preferred embodiment of a method for coordinate generation using an orientation device according to the present invention.
Figure 7B:
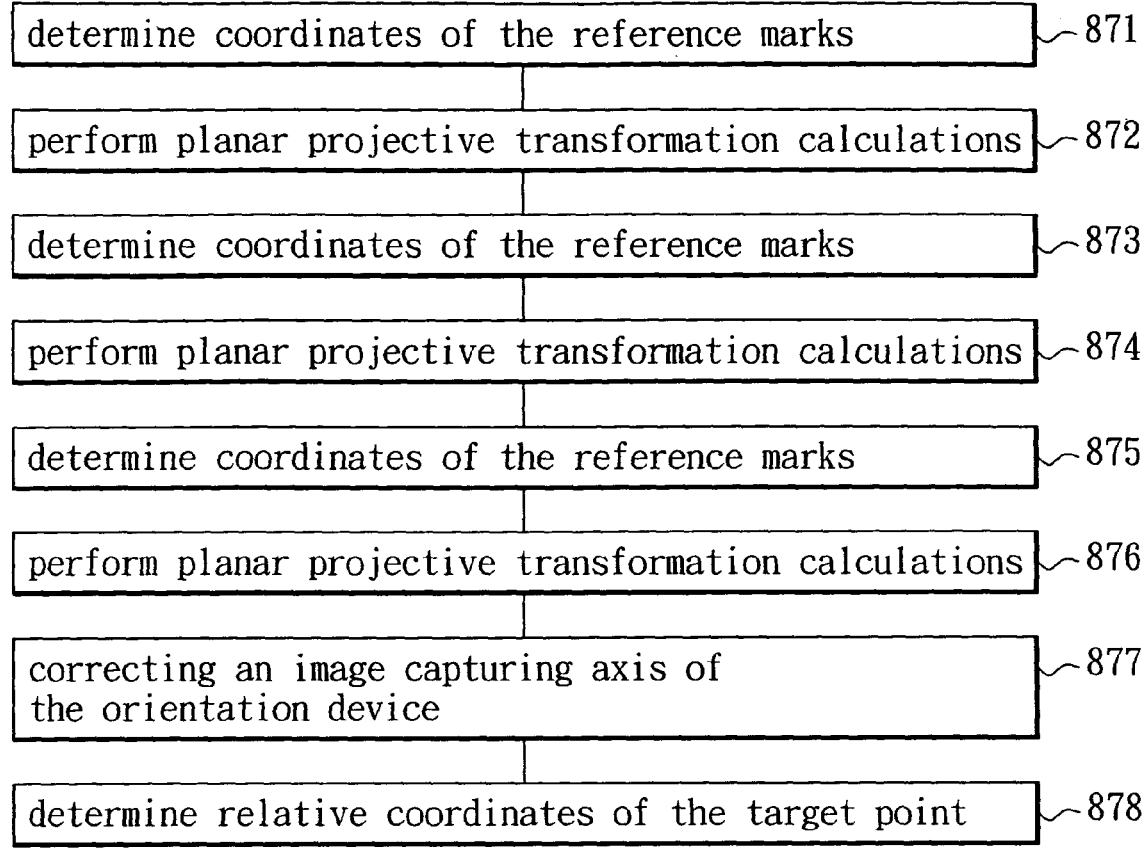

The second preferred embodiment of a method for coordinate generation to be implemented using the orientation device 3 of the system 100 according to this invention will now be described with further reference to FIGS. 7A and 7B.

In step 71, each of the reference marks 111, 112, 113, 114 is provided adjacent to a respective one of the corners (A, B, C, D) of the screen 110 of the display 11. That is, with further reference to FIG. 8, the coordinates of each of the reference marks 111, 112, 113, 114 are distinct from those of the adjacent corner (A, B, C, D) of the screen 110 of the display 11.

In step 72, the orientation device 3 is aimed at an initial point on the screen 110 of the display 11.

It is noted that, in this step, one of the reference marks 111, 112, 113, 114, such as the reference mark 111, serves as the initial point on the screen 110 of the display 11.

In step 73, the orientation device 3 is operated such that the sensor 321 of the controller module 32 of the orientation device 3 is able to capture an image of the screen 110 of the display 11 that contains the reference mark 111 aimed in step 72.

In step 74, from the image captured in step 73, the processor 322 of the controller module 32 of the orientation device 3 correlates the coordinate space of the orientation device 3 with the coordinate space of the screen 110 of the display 11.

It is noted that, in this step, the processor 322 of the controller module 32 of the orientation device 3 determines an axis correction value ($X_{ref}$) associated with mapping of the initial point 111 onto the coordinate space of the orientation device 3, as illustrated in FIG. 6.

Figure 8:
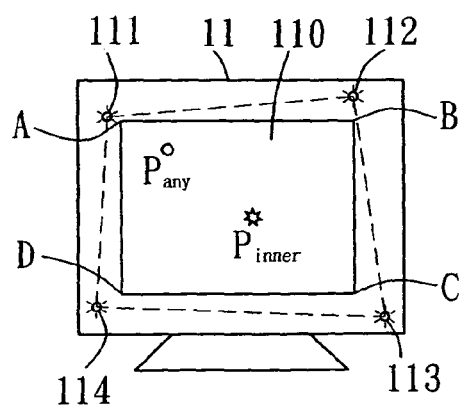
FIG. 8 illustrates an arbitrary point aimed by the orientation device.

In step 75, as illustrated in FIG. 8, the orientation device 3 is aimed at an arbitrary point ($P_{inner}$) on the screen 110 of the display 11.

Figure 9:
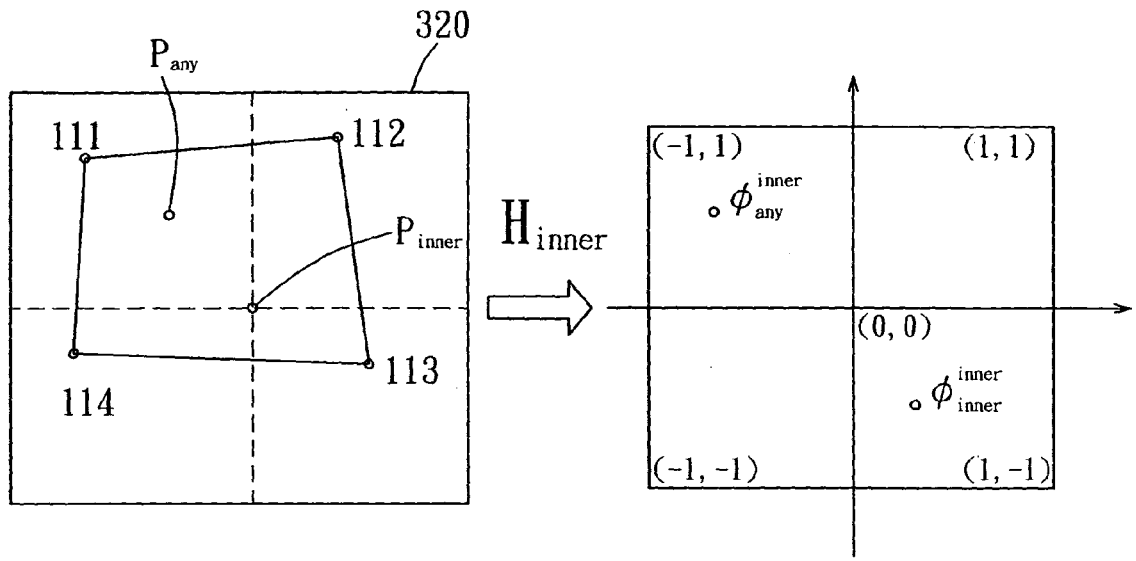
FIG. 9 illustrates a projective transformation matrix ($H_{inner}$) obtained by the orientation device.

In step 76, as illustrated in FIG. 9, the orientation device 3 is operated such that the sensor 321 of the controller module 32 of the orientation device 3 is able to capture an image 320 of the screen 110 of the display 11 that contains the reference marks 111, 112, 113, 114.

In step 77, the orientation device 3 is aimed at the upper left corner (A) of the screen 110 of the display 11.

In step 78, the orientation device 3 is operated such that the sensor 321 of the controller module 32 of the orientation device 3 is able to capture an image of the screen 110 of the display 11 that contains the reference marks 111, 112, 113, 114.

In step 79, the orientation device 3 is aimed at the upper right corner (B) of the screen 110 of the display 11.

In step 80, the orientation device 3 is operated such that the sensor 321 of the controller module 32 of the orientation device 3 is able to capture an image of the screen 110 of the display 11 that contains the reference marks 111, 112, 113, 114.

In step 81, the orientation device 3 is aimed at the lower right corner (C) of the screen 110 of the display 11.

In step 82, the orientation device 3 is operated such that the sensor 321 of the controller module 32 of the orientation device 3 is able to capture an image of the screen 110 of the display 11 that contains the reference marks 111, 112, 113, 114.

In step 83, the orientation device 3 is aimed at the lower left corner (D) of the screen 110 of the display 11.

In step 84, the orientation device 3 is operated such that the sensor 321 of the controller module 32 of the orientation device 3 is able to capture an image of the screen 110 of the display 11 that contains the reference marks 111, 112, 113, 114.

In step 85, as illustrated in FIG. 8, the orientation device 3 is aimed at a target point ($P_{any}$) on the screen 110 of the display 11.

Figure 10:
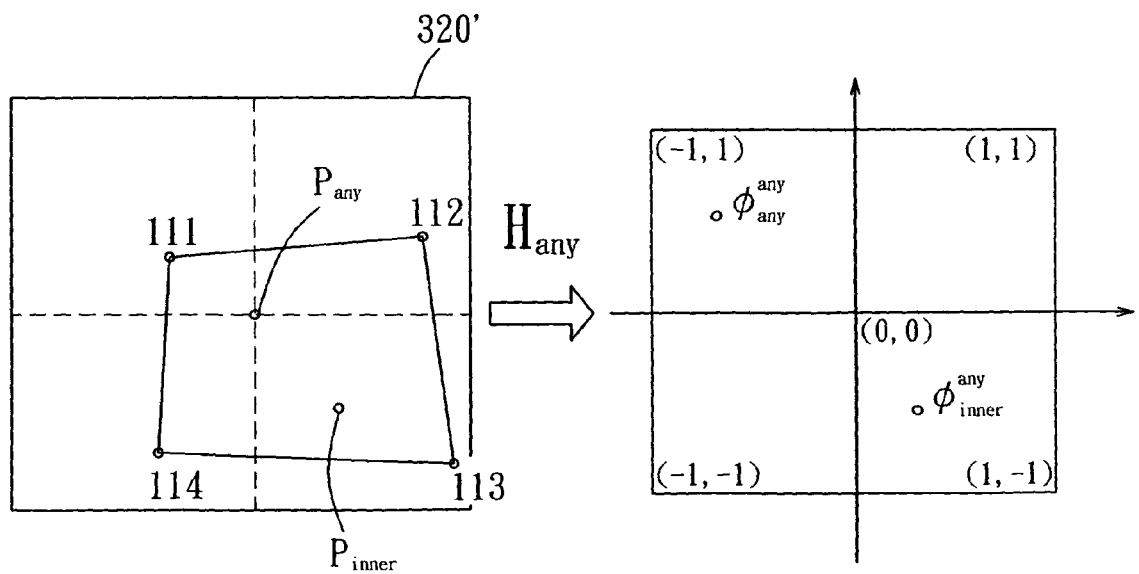
FIG. 10 illustrates another projective transformation matrix ($H_{any}$) obtained by the orientation device.

In step 86, as illustrated in FIG. 10, the orientation device 3 is operated such that the sensor 321 of the controller module 32 of the orientation device 3 is able to capture an image 320' of the screen 110 of the display 11 that contains the reference marks 111, 112, 113, 114.

In step 87, the processor 322 of the controller module 32 of the orientation device 3 determines the relative coordinates of the target point ($P_{any}$) with reference to the coordinate space relation established in step 74, and the images captured in steps 76, 78, 80, 82, 84 and 86. Thereafter, the flow goes back to step 85.

In this embodiment, step 87 includes the sub-steps of:

sub-step 871: determining coordinates of the reference marks 111, 112, 113, 114 in the image captured in step 76;

sub-step 872: performing planar projective transformation calculations upon the coordinates of the reference marks determined in sub-step 871 to obtain a transformation matrix ($H_{inner}$), as illustrated in FIG. 9;

sub-step 873: determining coordinates of the reference marks 111, 112, 113, 114 in the images captured in steps 78, 80, 82, and 84;

sub-step 874: performing planar projective transformation calculations upon the coordinates of the reference marks 111, 112, 113, 114 determined in sub-step 873 to obtain transformation matrices ($H_a$, $H_b$, $H_c$, $H_d$);

sub-step 875: determining coordinates of the reference marks 111, 112, 113, 114 in the image captured in step 86;

sub-step 876: performing planar projective transformation calculations upon the coordinates of the reference marks determined in sub-step 875 to obtain a transformation matrix ($H_{any}$), as illustrated in FIG. 10;

sub-step 877: correcting an image-capturing axis of the orientation device based on the transformation matrix ($H_{inner}$) obtained in sub-step 872, the transformation matrices ($H_a$, $H_b$, $H_c$, $H_d$) obtained in sub-step 874, the transformation matrix ($H_{any}$) obtained in sub-step 876, and the axis correction value ($X_{ref}$) obtained in step 74; and sub-step 878: determining the relative coordinates of the target point ($P_{any}$) with reference to the corrected image capturing axis.

It is noted that steps 71 to 84 are performed only to calibrate the orientation device 3. Once calibrated, steps 71 to 84 are skipped. Steps 72 to 84 may be skipped if the system is installed under pre-defined parameters.

In the first and second preferred embodiments, the game controller 12 controls game progress, including presentation of images on the screen 110 of the display 11, in response to the relative coordinates of the target point determined by the processor 322 of the orientation device 3.

It has thus been shown that, in the method and orientation device 3 of this invention coordinates of target points are generated without referring to scanning information of images presented on the displays. The present invention is thus applicable to wide variety of targets, including those displays that do not use interlace scanning.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for coordinate generation to be implemented using an orientation device, which is provided with a sensor that has an optical axis, said method comprising the steps of:
   A) providing at least three reference marks on a target that defines a first coordinate space;
   B) aiming the orientation device at an initial point on the target, and operating the orientation device such that the sensor is able to capture an image of the target that contains at least one of the reference marks, wherein one of the reference marks serves as the initial point;
   C) from the image captured in step B), determining an axis correction value, which is an offset of the optical axis of the sensor from an axis of the orientation device;
   D) aiming the orientation device at a target point on the target, and operating the orientation device such that the sensor is able to capture an image of the target that contains the reference marks and that defines a second coordinate space; and
   E) determining coordinates of the target point on the first coordinate space of the target with reference to the axis correction value and a relation established between the first coordinate space of the target and the second coordinate space of the image captured in step D), wherein step E) includes:
   E1) determining coordinates of the reference marks on the second coordinate space of the image captured in step D) and assigning each of the corners of the target with coordinates on the first coordinate space of the target;
   E2) performing planar projective transformation calculations upon the coordinates of the reference marks determined in sub-step E1) and the coordinates of the corners of the target assigned in sub-step E1) to obtain a first transformation matrix;
   E3) determining the coordinates of the target point on the first coordinate space of the target with reference to the first transformation matrix obtained in sub-step E2) and the axis correction value determined in step C).

2. A method for coordinate generation to be implemented using an orientation device, which is provided with a sensor that has an optical axis, said method comprising the steps of:
   A) providing at least three reference marks on a tar et that defines a first coordinate space, wherein the target has four corners, each of which has a respective coordinate distinct from those of the reference marks;
   B) aiming the orientation device at an initial point on the target, and operating the orientation device such that the sensor is able to capture an image of the target that contains at least one of the reference marks;
   C) from the image captured in step B), determining an axis correction value, which is an offset of the optical axis of the sensor from an axis of the orientation device;
   D) aiming the orientation device at an arbitrary point on the target, and operating the orientation device such that the sensor is able to capture an image of the target that contains the reference marks; and
   E) aiming the orientation device at each of the corners of the tar et in sequence, and operating the orientation device in said sequence such that the sensor is able to capture four images of the target that contain the reference marks and that correspond to the aimed corners, respectively;
   F) aiming the orientation device at a target point on the target, and operating the orientation device such that the sensor is able to capture an image of the target that contains the reference marks and that defines a second coordinate space; and
   G) determining coordinates of the target point on the first coordinate space of the target with reference to the axis correction value, a relation established between the first coordinate space of the target and the second coordinate space of the image captured in step F), the image captured in step D) and the four images captured in step E), wherein step G) includes:
   G1) determining coordinates of the reference marks in the image captured in step F), defining a virtual coordinate space, and assigning each of the reference marks with coordinates on the virtual coordinate space;
   G2) performing planar projective transformation calculations upon the coordinates of the reference marks determined in sub-step G1) and the coordinates of the reference marks assigned in sub-step Ea) to obtain a first transformation matrix;
   G3) determining coordinates of the reference marks in each of the four images captured in step D); and
   G4) performing planar projective transformation calculations upon the coordinates of the reference marks determined in sub-step G3)) and the coordinates of the reference marks assigned in sub-step G1) to obtain four reference transformation matrices;
   G5) determining coordinates of the corners of the target on the virtual coordinate space with reference to the first transformation matrix and the four reference transformation matrices and assigning each of the corners of the target with coordinates on the first coordinate space of the target; and G6) performing planar projective transformation calculations upon the coordinates of the corners of the target determined in sub-step G5) and the coordinates of the corners of the target assigned in sub-step G5) to obtain a second transformation matrix.

3. The method as claimed in claim 2, wherein step G) further includes:

G7) determining coordinates of the reference marks on the second coordinate space of the image captured in step D);

G8) performing planar projective transformation calculations upon the coordinates of the reference marks determined in sub-step G7) and the coordinates of the corners of the target assigned in sub-step G5) to obtain a third transformation matrix; and G9) determining the coordinates of the target point with reference to the first transformation matrix obtained in sub-step G2), the second transformation matrix obtained in sub-step G6), the third transformation matrix obtained in sub-step G8), and the axis correction value determined in step C).

* * * * *

UNITED STATES PATENT AND TRADEMARK OFFICE
CERTIFICATE OF CORRECTION

| | | |
|---|---|---|
| PATENT NO. | : 7,857,703 B2 | Page 1 of 1 |
| APPLICATION NO. | : 11/392089 | |
| DATED | : December 28, 2010 | |
| INVENTOR(S) | : Lin et al. | |

It is certified that error appears in the above-identified patent and that said Letters Patent is hereby corrected as shown below:

Title Page item 73 should read:

According to Part-B Fee(s) Transmittal, the Name of Assignee was listed as "PixArt Imaging Incorporation."

Signed and Sealed this
Eighth Day of March, 2011

David J. Kappos
*Director of the United States Patent and Trademark Office*